US005445704A

United States Patent [19]

Dizon

[11] Patent Number: 5,445,704

[45] Date of Patent: Aug. 29, 1995

[54] WALLPAPER APPLICATOR

[76] Inventor: Cipriano Dizon, 161 Springhead Gardens, Richmond Hill, Ontario, Canada, L4C 5G2

[21] Appl. No.: 182,329

[22] Filed: Jan. 18, 1994

[51] Int. Cl.[6] .................... B32B 31/00

[52] U.S. Cl. .................... 156/574; 156/576; 156/577; 156/579

[58] Field of Search .................... 156/574, 576, 575, 577, 156/579, 523, 524

[56] References Cited

U.S. PATENT DOCUMENTS

| | | | |
|---|---|---|---|
| 802,292 | 10/1905 | Howell | 156/577 X |
| 1,331,436 | 2/1920 | Jensen | 156/576 |
| 2,097,660 | 11/1937 | Gordon | 156/576 |
| 4,072,547 | 2/1978 | Pavnica | 156/576 X |
| 4,210,485 | 7/1980 | Lake | 156/577 |
| 4,281,464 | 8/1981 | Hession et al. | 33/408 |
| 4,806,184 | 2/1989 | Shannon | 157/71 |

*Primary Examiner*—James J. Engel

*Attorney, Agent, or Firm*—Jeffrey T. Imai; Arne I. Fors; D. Doak Horne

[57] ABSTRACT

A wallpaper applicator comprises a handle portion comprising a gripping portion, a first frame member and a second frame member. The gripping portion, first frame member and second frame member are arranged in an "I" configuration. The first frame member has a trimmer guide and a clip pivotally mounted and biased in a closed condition for releasably retaining an end of a strip of wallpaper. The second frame member has frame extensions and a guide rod rotatably mounted at a remote end thereof. Two parallel foam cushioned rollers are rotatably mounted on the handle for rolling along a wall. The first frame member rotatably engages a first roller and the second frame member rotatably engages a second roller. The trimmer guide has a straight edge extending substantially parallel to the cushioned rollers. The wallpaper applicator pivots about one of the cushioned rollers for applying the trimmer guide to a corner between a ceiling and wall. Wallpaper is threadable over the guide rod, about the cushioned rollers, about the trimmer guide and releasably retained by the retainer means for applying wallpaper to the corner. Upon releasing the wallpaper, the applicator is rolled along applying the wallpaper to the wall.

11 Claims, 2 Drawing Sheets

WALLPAPER APPLICATOR

FIELD OF THE INVENTION

This invention relates to a device for applying and dispensing wallpaper.

BACKGROUND OF THE INVENTION

The application of wallpaper is not an easy task, especially for beginners. The application of wallpaper, particularly patterned wallpaper, is a time consuming process, often resulting in frustration and wastage.

Several wallpaper applicators have been proposed for simplifying the wallpaper application process. Such devices are more particularly described in U.S. Pat. Nos. 4,210,485 and 4,806,184. These devices are generally bulky and difficult to manipulate. More importantly, the prior art applicators have two serious drawbacks.

First, the devices are designed to apply tension to the wallpaper as it is being applied to the wall. As the wallpaper dries, the wallpaper relaxes and contracts. Adjacent sheets of wallpaper usually contract at different rates and at different locations. When using patterned wallpaper, where the patterns of adjacent sheets must match up exactly, this becomes particularly acute.

Secondly, the prior art applicators do not assist the user in initially positioning the strip of wallpaper so that it aligns properly with respect to the ceiling and with respect to adjacent strips of wallpaper.

SUMMARY OF THE INVENTION

The disadvantages of the prior art may be overcome by providing a wallpaper applicator having a clip for retaining the leading end of the wallpaper strip about a cutter bar for placing the strip of wallpaper at the corner between the wall and the ceiling and having a plurality of cushioned rollers for pressing the wallpaper against the wall as the applicator progresses along.

According to one aspect of the invention a wallpaper dispensor and applicator comprises a handle portion comprising a gripping portion, a first frame member and a second frame member. The gripping portion, first frame member and second frame member are arranged in an "I" configuration. The first frame member has a trimmer guide and a clip pivotally mounted and biased in a closed condition for releasably retaining an end of a strip of wallpaper. The second frame member has frame extensions and a guide rod rotatably mounted at a remote end thereof. Two parallel foam cushioned rollers are rotatably mounted on the handle for rolling along a wall. The first frame member rotatably engages a first roller and the second frame member rotatably engages a second roller. The trimmer guide has a straight edge extending substantially parallel to the cushioned rollers. The wallpaper applicator pivots about one of the cushioned rollers for applying the trimmer guide to a corner between a ceiling and wall. Wallpaper is threadable over the guide rod, about the cushioned rollers, about the trimmer guide and releasably retained by the retainer means for applying wallpaper to the corner. Upon releasing the wallpaper, the applicator is rolled along applying the wallpaper to the wall.

According to another aspect of the invention, the first frame member has a plumb bob and the second member has a plumb marking. The plumb bob will align with the plumb marking when the applicator is in a generally vertical position and the rollers extend horizontally.

DESCRIPTION OF THE DRAWINGS

In drawings which illustrate the preferred embodiment of the invention.

DETAILED DESCRIPTION OF THE INVENTION

Figure 1:
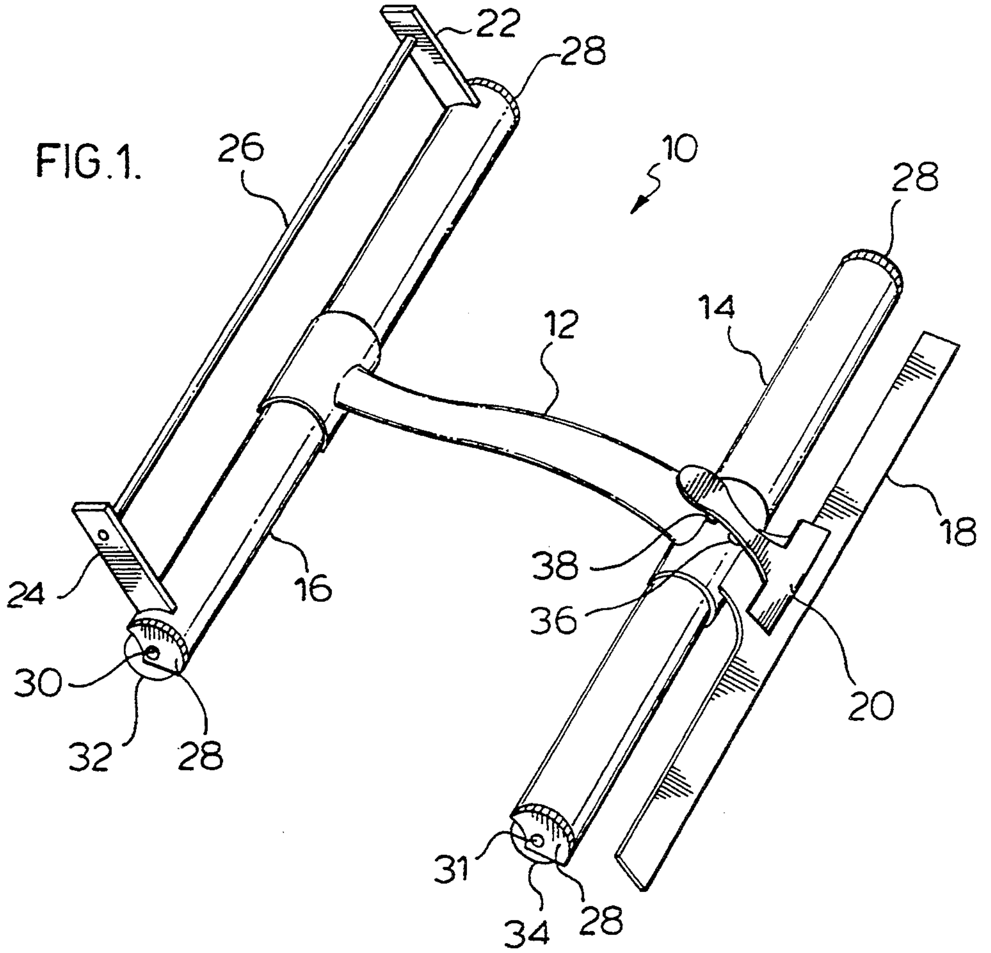
FIG. 1 is a perspective view of the wallpaper dispensor and applicator of the present invention.

The wallpaper dispensor and applicator of the present invention is generally illustrated as 10 in FIG. 1. Applicator 10 generally comprises a handle 12, frame member 14 and frame member 16. Handle 12 and frame members 14 and 16 are arranged in an "I" configuration. In the preferred embodiment handle and frame members 14 and 16 are manufactured as an integral unit of a lightweight plastic material. However, a modular format which allows the applicator to be assembled and disassembled may also be used.

At the forward end of handle 12 is trimmer guide 18 and clip 20. Frame member 16 is provided with frame extensions 22 and 24 having guide rod 26 extending therebetween at the remote ends thereof.

Each end of frame members 14 and 16 are provided with end caps 28. End caps 28 are adapted to releasably receive axles 30 and 31. Concentrically mounted about axle 30 and 31 are rollers 32 and 34. In the preferred embodiment, rollers 32 and 34 are made of a synthetic sponge or foam material. Foam pipe insulation has been found to be suitable. The diameter of rollers 32 and 34 are such that when applicator 10 rolls along a surface, guide bar 18 is spaced from the surface. In other words, the guide bar 18 does not drag over the wallpaper as the applicator rolls along.

The axis of rotation of axle 30 and the axis of rotation of axle 31 are substantially parallel to each other. Similarly, the forward edge of trimmer guide 18 is substantially parallel to the axis of rotation of axles 30 and 31.

Clip 20 is pivotally mounted to the forward end of handle 12 at pivot 36 and biased by spring 38 to a closed position at the forward end of clip 20.

Figure 2:
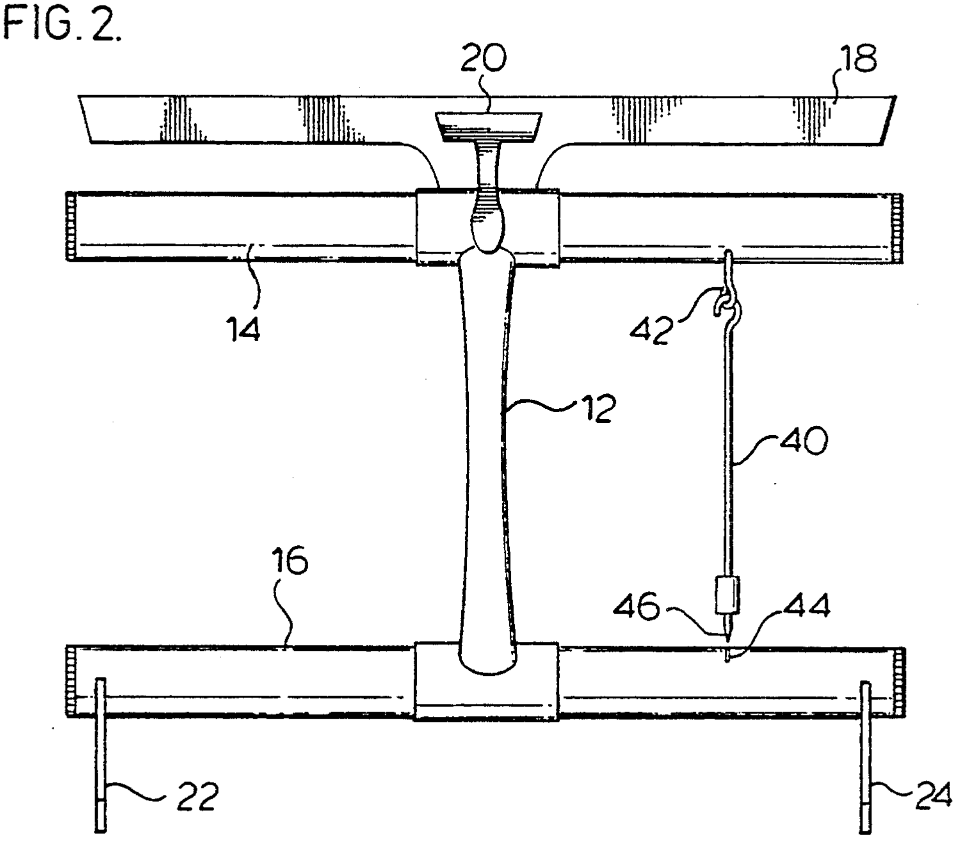
FIG. 2 is a top plan view of the frame of the wallpaper dispensor and applicator of FIG. 1.
Figure 3:
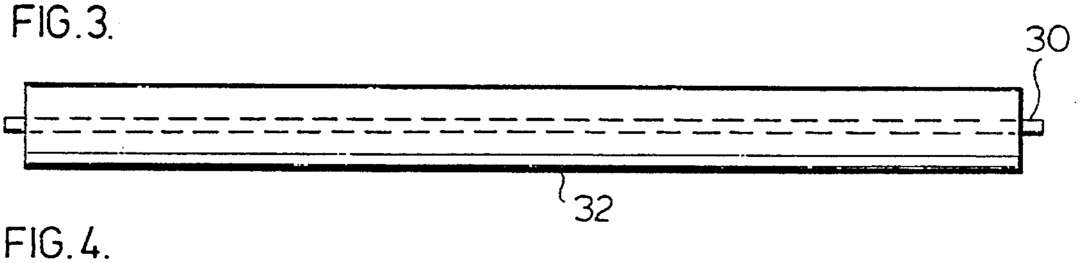
FIG. 3 is a top plan view of the roller of the wallpaper dispensor and applicator of FIG. 1.
Figure 4:
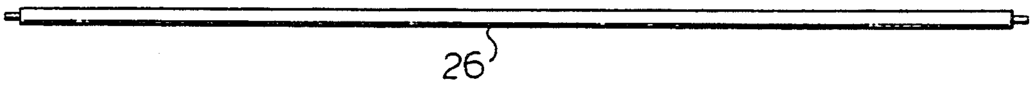
FIG. 4 is a top plan view of the guide bar of the wallpaper dispensor and applicator of FIG. 1.
Figure 5:
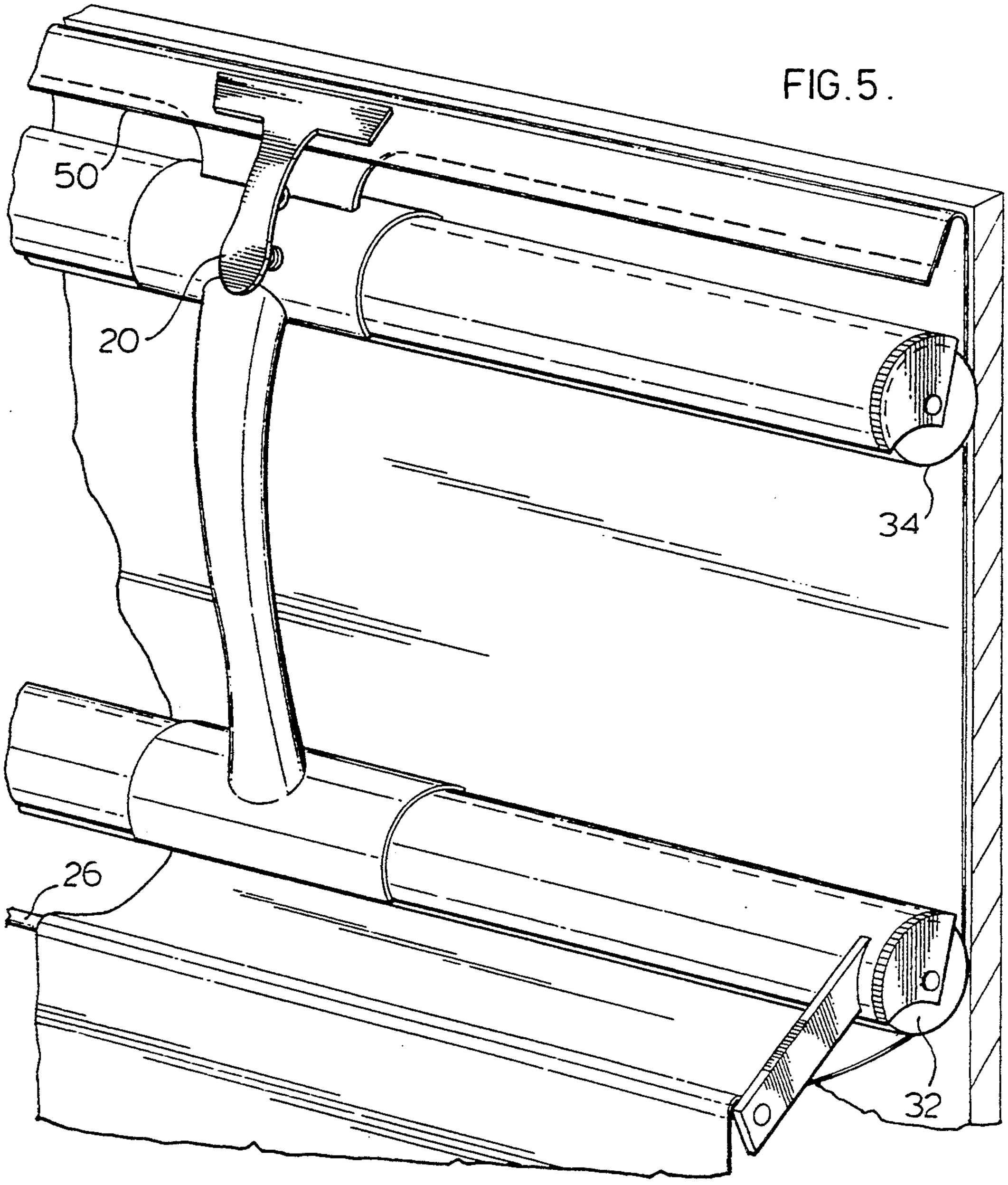
FIG. 5 is a perspective view of the wallpaper dispensor and applicator of FIG. 1 applying a strip of wallpaper.

Referring to FIG. 2, frame 14 optionally may be provided with a plumb bob 40. Plumb bob 40 is hung from frame member 14 by hook 42. On frame member 16 a plumb marking 44 is painted thereon. As is apparent, when the axis of rotation of axles 30 and 31 are horizontal, the tip 46 of plumb bob 40 will substantially align with plumb marking 44.

In use, a strip of wallpaper is unrolled on a suitable horizontal surface. The desired length, with a few spare inches on each end, is cut. The wallpaper is unrolled further and placed adjacent the first strip of wallpaper and aligned with the corresponding pattern. The wallpaper is marked to identify where the strip is to be placed into the corner between the wall and the ceiling. The procedure is repeated until sufficient paper has been cut to fully cover the wall to be covered.

To apply the wallpaper, the wallpaper is soaked in water using a suitable tray to activate the adhesive. The leading end 50 of the wetted wallpaper is strung over guide bar 26 around sponge roller 32 past sponge roller 34 about trimmer guide 18 and folded back to be retained by clip 20. The edge of trimmer guide 18 is aligned with the mark identifying the location of the wallpaper to be placed, where the ceiling and wall meet. The wallpaper applicator is pivoted about roller 34 until the trimmer guide is firmly placed in the corner between the ceiling and the wall. The user can use the plumb bob 40 for determining whether the applicator is plumb. Once the applicator is plumb, the user presses on clip 20 releasing leading end 50 of the wallpaper. The applicator is then moved downwardly applying the wallpaper to the wall.

As the applicator 10 is rolling downwardly, guide bar 26 prevents the unapplied portion of the wallpaper sheet from sticking to the wall prematurely. The user then uses a conventional sponge and scraper to remove the bubbles which may have formed between the wall and the wallpaper. Once the sheet has been applied, the user can use the trimmer guide 18 to trim the excess portions of the wallpaper both at the ceiling and the floor end of the applied strip.

The user then repeats the process for the next sheet of wallpaper to be applied adjacent the previous sheet. After the initial alignment of the wallpaper is established with the plumb bob, subsequent alignment with adjacent sheets of wallpaper is determined by approximating the space between the edge of rollers 32 and 34 and the edge of the applied sheet of wallpaper. From time to time, the alignment can be checked with the plumb bob. Otherwise, the plumb bob may be removed to lighten the wallpaper applicator 10.

Although the disclosure describes and illustrates preferred embodiments of the invention, it is to be understood that the invention is not limited to these particular embodiments. Many variations and modifications will now occur to those skilled in the art. For a definition of the invention, reference is to be made to the appended claims.

I claim:

1. A wallpaper applicator comprising a handle having a forward end and an opposite end, said forward end having a trimmer guide and a retainer means for releasably retaining an end of a strip of wallpaper, and said opposite end having a guide rod, said handle having at least two parallel cushioned rollers rotatably mounted thereon for rolling said applicator along, a forward one of said cushioned rollers being mounted at said forward end and an opposite one being mounted at said opposite end, said trimmer guide having a straight edge extending substantially parallel to and forward of said forward one of said cushioned rollers, said applicator being pivotable about said forward one of said cushioned rollers for applying said trimmer guide to a corner between a ceiling and wall aligning said applicator in a generally vertical condition and pivotable in an opposite sense for spacing said trimmer guide from a surface upon which said cushioned rollers roll along, whereby wallpaper is threadable over said guide rod, about said cushioned rollers, about said trimmer guide and said retaining means releasably retains said end of a strip of wallpaper aligning said trimmer guide with a predetermined location on said wallpaper.

2. An applicator as claimed in claim 1 wherein said cushioned rollers comprise an axle covered by a foam material.

3. An applicator as claimed in claim 1 wherein said retaining means is a clip pivotally mounted and biased in a closed condition.

4. An applicator as claimed in claim 1 wherein said handle comprises a gripping portion and a first frame member and a second frame member, said gripping portion, first frame member and second frame member arranged in an "I" configuration.

5. An applicator as claimed in claim 4, wherein said first frame member rotatably engages said forward one of said cushioned rollers and said second frame member rotatably engages said opposite one of said cushioned rollers.

6. An applicator as claimed in claim 5 wherein said gripping portion, first frame member and second frame member are integral with each other.

7. An applicator as claimed in claim 4 wherein said first frame member is provided with a plumb bob and said second member has a plumb marking, whereby said plumb bob will align with the plumb marking when said applicator is in a generally vertical position and said rollers extend horizontally.

8. An applicator as claimed in claim 1, wherein said opposite end has frame extensions extending away from said cushioned rollers and said guide rod is rotatably mounted at a remote end thereof, whereby when said applicator is in a generally vertical position on the wall with wallpaper threaded thereabout, said guide rod spaces the wallpaper from the wall.

9. A wallpaper applicator comprising a handle having a gripping portion, a forward frame member and an opposite frame member, said gripping portion, forward frame member and opposite frame member arranged in an "I" configuration, said forward frame member having a trimmer guide and a dip, said clip being pivotally mounted and biased in a closed condition for releasably retaining an end of a strip of wallpaper, said opposite frame member having frame extensions extending therefrom and a guide rod rotatably mounted at remote ends thereof, said handle portion having two parallel foam cushioned rollers rotatably mounted thereon for rolling along, said forward frame member rotatably engages a forward one of said cushioned rollers and said opposite frame member rotatably engages an opposite one of said cushioned rollers, said trimmer guide having a straight edge extending substantially parallel to and forward of said forward one of said cushioned rollers, said applicator being pivotable about said forward one of said cushioned rollers for applying said trimmer guide to a corner between a ceiling and wall aligning said applicator in a generally vertical condition and pivotable in an opposite sense for spacing said trimmer guide from a surface upon which said cushioned rollers roll along, whereby wallpaper is threadable over said guide rod, about said cushioned rollers, about said trimmer guide and said clip releasably retains said end of a strip of wallpaper aligning said trimmer guide with a predetermined location on said wallpaper.

10. An applicator as claimed in claim 9 wherein said gripping portion, forward frame member and opposite frame member are integral with each other.

11. An applicator as claimed in claim 9 wherein said forward frame member has a plumb bob and said opposite member has a plumb marking, whereby said plumb bob will align with the plumb marking when said applicator is in a generally vertical position and said cushioned rollers extend horizontally.

* * * * *